July 31, 1945.  G. I. GOODWIN  2,380,835
CLUTCH PLATE
Filed Sept. 20, 1940  5 Sheets-Sheet 1
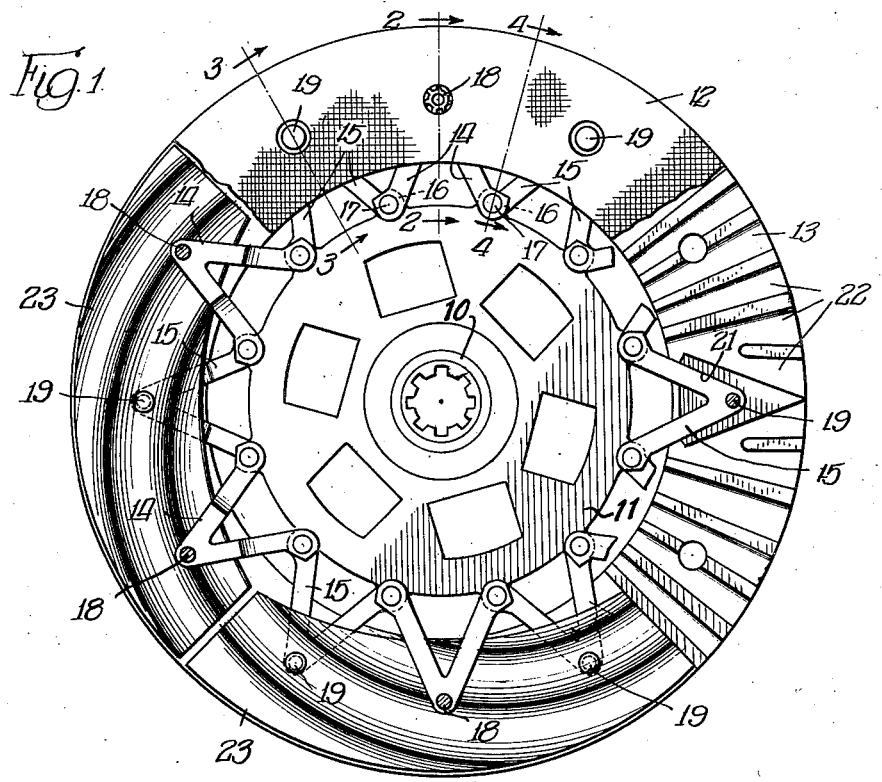
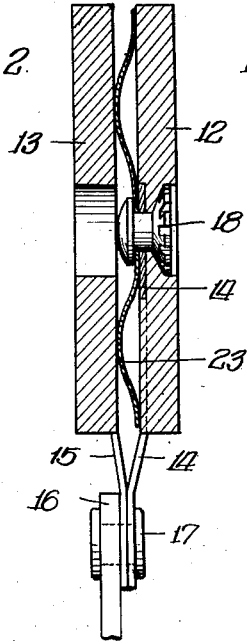
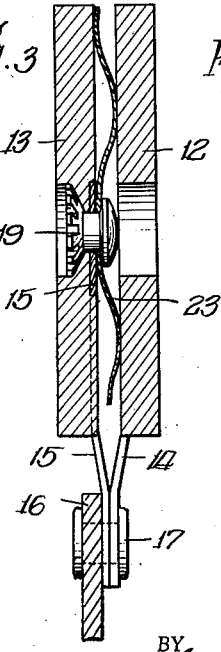
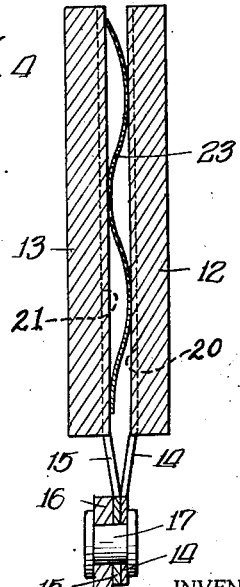
INVENTOR.
George I. Goodwin,
BY Cromwell, Greist & Warden
attys.

July 31, 1945.  G. I. GOODWIN  2,380,835
CLUTCH PLATE
Filed Sept. 20, 1940   5 Sheets-Sheet 2
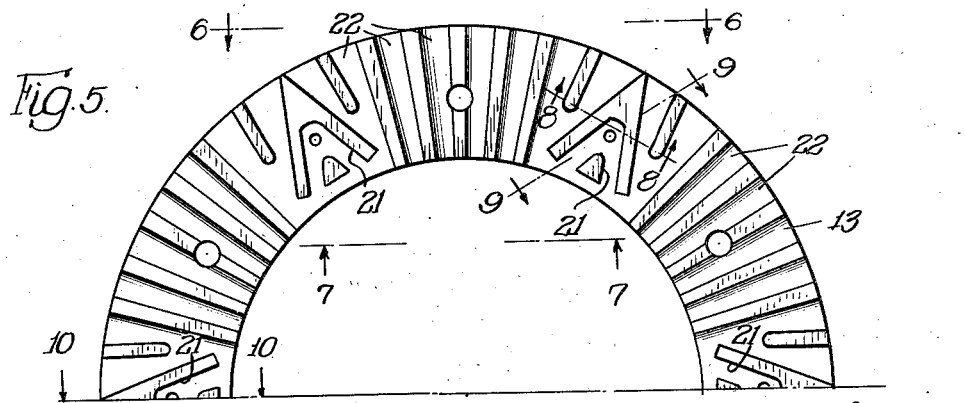
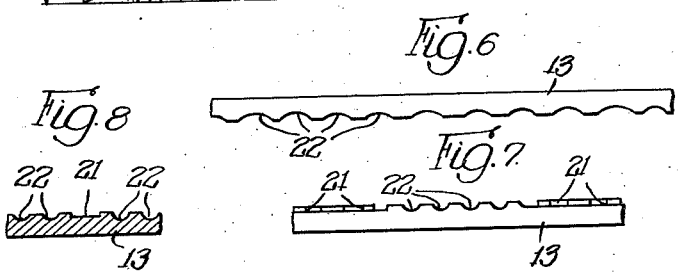
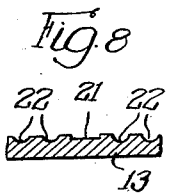
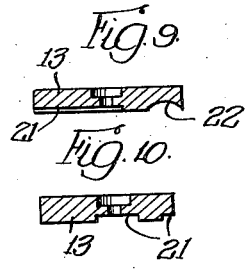
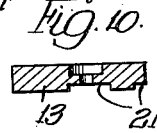
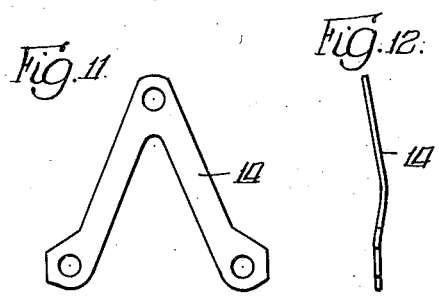
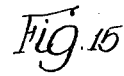
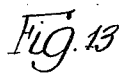
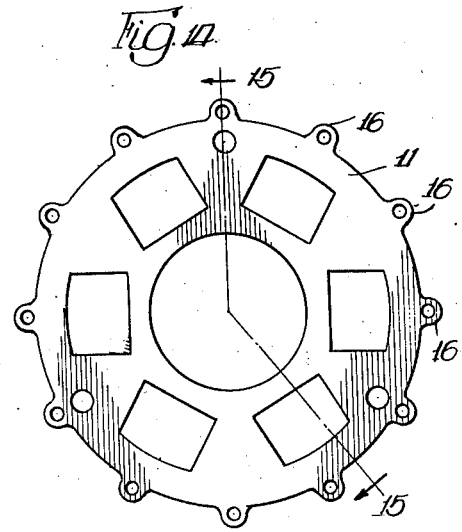
INVENTOR.
George I. Goodwin,
BY Cromwell, Greist + Warden
attys.

July 31, 1945. G. I. GOODWIN 2,380,835
CLUTCH PLATE
Filed Sept. 20, 1940 5 Sheets-Sheet 3
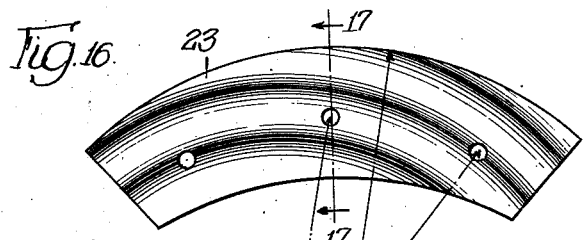
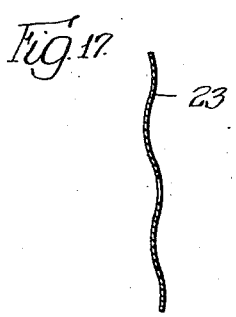
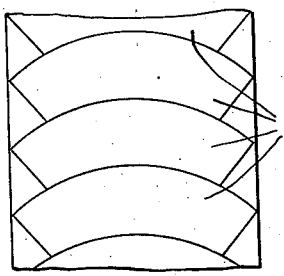
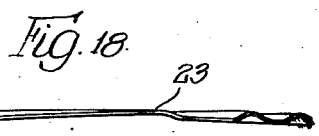
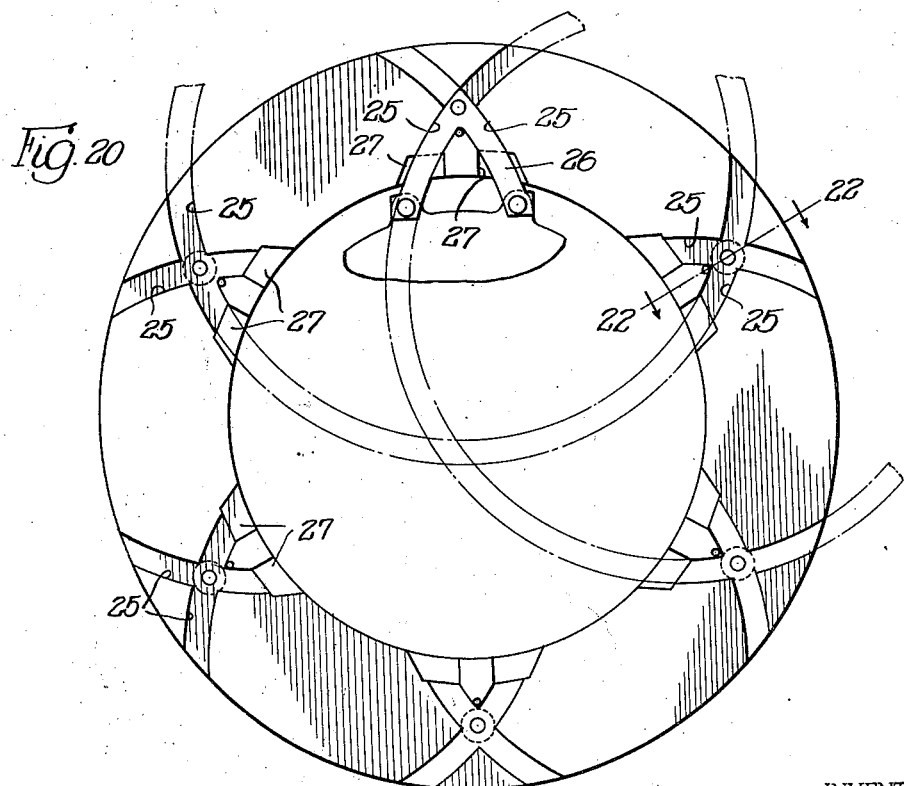
INVENTOR.
George I. Goodwin,
BY Cromwell, Greist + Warden
attys.

July 31, 1945. G. I. GOODWIN 2,380,835
CLUTCH PLATE
Filed Sept. 20, 1940 5 Sheets-Sheet 4

INVENTOR.
George I. Goodwin
BY Cromwell, Greist + Warden
Attys.

July 31, 1945.   G. I. GOODWIN   2,380,835
CLUTCH PLATE
Filed Sept. 20, 1940   5 Sheets-Sheet 5
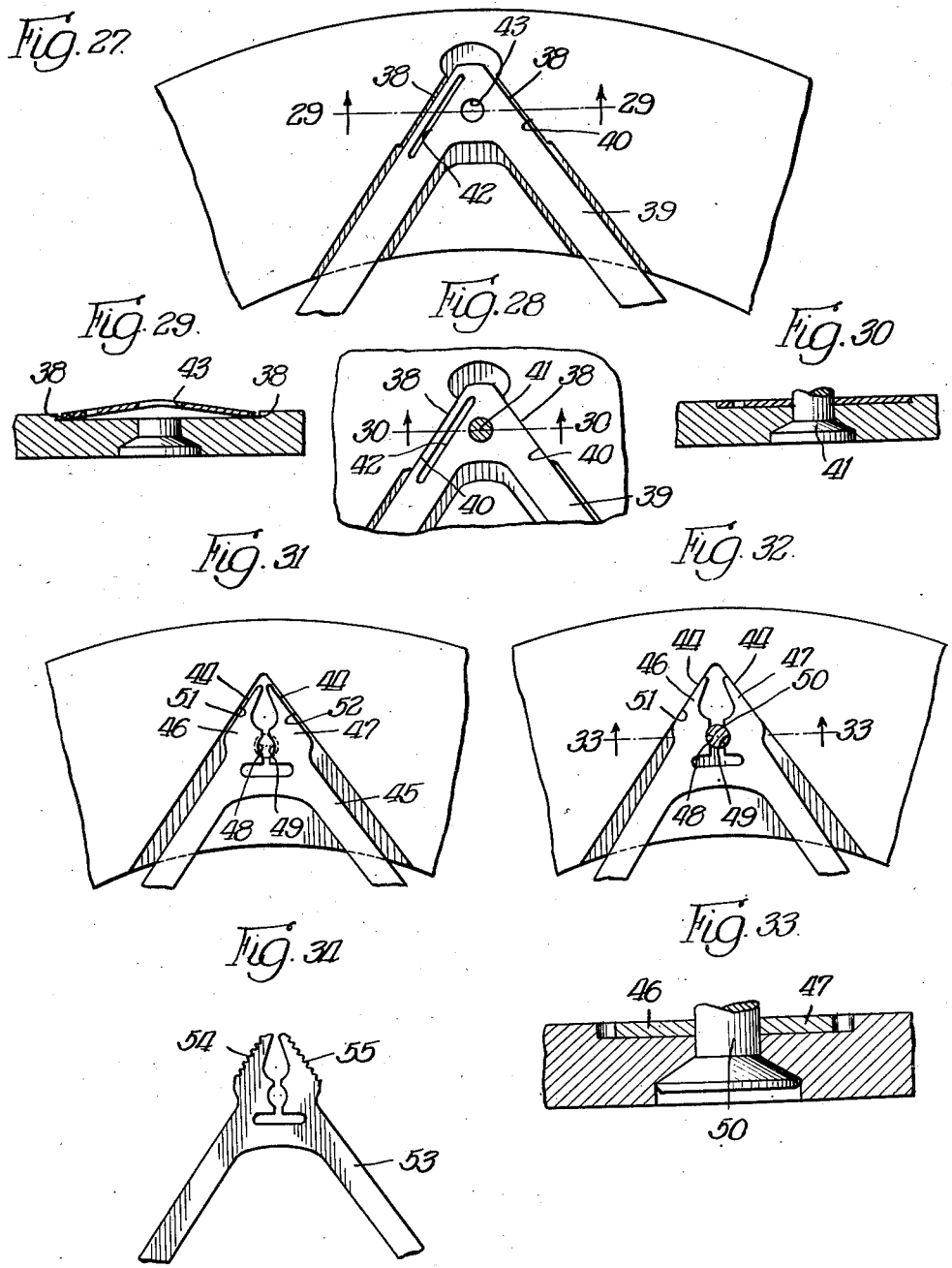
INVENTOR.
George I. Goodwin,
BY Cromwell, Greist & Warden
attys Patented July 31, 1945

2,380,835

UNITED STATES PATENT OFFICE 2,380,835

CLUTCH PLATE

George I. Goodwin, Detroit, Mich.

Application September 20, 1940, Serial No. 357,620

21 Claims. (Cl. 192—107)

This invention has to do with clutch plates of the type in which a resiliently yieldable cushioning structure is employed adjacent the periphery of the plate between the annular friction facings, and is particularly concerned with clutch plates of this type in which the friction facings are mounted on special driving members which are secured to and project outwardly from the center portion of the plate.

One object of the invention is to provide an improved clutch plate of the type described in which the special driving members on which the friction facings are mounted are so arranged as to constitute a truss-like formation.

Another object is to provide such a construction in which the same rivets or other attaching means can be employed for securing the driving members of both facings to the center portion of the clutch plate.

Another object is to provide such a construction in which the driving members are inlaid within substantially V-shaped locking grooves in the inside or non-friction surfaces of the facings.

Another object is to provide such a construction in which the driving members are so shaped, and relieved portions in the facings are so located and shaped in the molding process of the facings, that the driving grooves in the facings may be rapidly and economically finished to exact size by milling, drilling, or other approved machining method.

Another object of the invention is to provide an improved clutch plate of the type described having a cushion member provided with a multiplicity of wave formations which afford a multiplicity of supporting points for both facings, with attaching means for fastening both facings to opposite sides of the cushion member, and with the cushion member so formed that the normal expansion of the cushion member when being flattened out may occur without causing any relative movement between the facings.

Another object is to provide such a clutch plate in which the cushioning means, in addition to being deformed to afford the desired cushioning, is bowed in a direction circumferentially of the assembly to draw together the facings attached to the same on opposite sides thereof, with a certain amount of initial tension.

A still further object of the invention is to provide driving means for the facings which are made out of spring metal and are so shaped that an axially flexible but circumferentially rigid driving connection is provided.

Other more specific objects and advantages of the invention will be evident to those skilled in the art upon a full understanding of the improved clutch plate.

Several different embodiments of the invention are presented herein for the purpose of exemplification, but it will of course be appreciated that such embodiments are intended to be illustrative only and that the invention is capable of incorporation in many other structurally modified forms coming within the scope of the appended claims.

In the accompanying drawings:

Fig. 1 is a partially broken away face view of a clutch plate constructed in accordance with the invention;

Figs. 2, 3 and 4 are enlarged radial sections through the clutch plate shown in Fig. 1, taken respectively on the lines 2—2, 3—3 and 4—4 of Fig. 1;

Fig. 5 is a fragmentary inside face view of one of the annular friction facings in the clutch plate of Fig. 1, with the cushioning members and driving members removed;

Fig. 6 is an edge view of the same facing, as viewed from the line 6—6 of Fig. 5;

Fig. 7 is an opposite edge view of the same facing, as viewed from the line 7—7 of Fig. 5;

Fig. 8 is a section, taken on the line 8—8 of Fig. 5;

Fig. 9 is a section taken on the line 9—9 of Fig. 5;

Fig. 10 is a section taken on the line 10—10 of Fig. 5;

Fig. 11 is a face view of one of the special V-shaped driving members;

Fig. 12 is an edge view of the driving member shown in Fig. 11;

Fig. 13 is a face view of a strip of metal, showing how the driving members can be cut to advantage from the metal with the grain of the metal extending in the same direction in all of the driving members;

Fig. 14 is a face view of the disk which constitutes a part of the center portion of the clutch plate;

Fig. 15 is a section through the same disk, taken on the composite radial line 15—15 of Fig. 14;

Fig. 16 is a face view of one of the cushion members;

Fig. 17 is a radial section through the same cushion member, taken on the line 17—17 of Fig. 16;

Fig. 18 is an edge view of the cushion member, showing the way in which the same may be bowed circumferentially to cause the facings which are attached to opposite sides at circumferentially spaced points to be forced toward each other;

Fig. 19 is a face view of a strip of metal, showing the way in which the cushion members may be cut to advantage from the strip;

Fig. 20 shows the inner side of one of the facings in a modified embodiment of the invention, with one of the driving members in position, and with the disk to which the driving member is attached shown but fragmentarily;

Fig. 27 is a fragmentary inside face view of another modified facing construction, in which the driving members are fitted and secured within the driving grooves by a self-tightening arrangement, one of the driving members being illustrated in position prior to being tightened;

Fig. 28 shows the same driving member after being tightened;

Fig. 29 is a section, taken on the line 29—29 of Fig. 27;

Fig. 30 is a similar section, taken on the line 30—30 of Fig. 28;

Fig. 31 shows a modified self-tightening arrangement, in which the attaching rivets act to spread the interlocking surfaces of the driving member into engagement with the edges of the driving groove;

Fig. 32 shows the same driving member after the interlocking surfaces thereof have been spread;

Fig. 33 is a section, taken on the line 33—33 of Fig. 32; and

Fig. 34 shows a modified form of the driving member of Fig. 31, in which the edges of the spreadable portions of the same are serrated to embed within the material of the facing at the edges of the driving groove.

Figure 21:
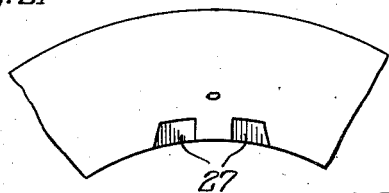
Fig. 21 is a fragmentary inside face view of the facing shown in Fig. 20, after the same has been molded but before the same has been milled to provide the grooves for the reception of the legs of the driving members.
Figure 22:
Fig. 22 is a radial section through the same facing, taken on the line 22—22 of Fig. 20.

Referring first to the embodiment shown in Figs. 1 to 15 inclusive, a clutch plate is shown which includes a hub 10, a disk 11 which is mounted at its center on the hub, and two annular friction facings 12 and 13 which are located beyond the outer periphery of the disk. The facing 12 is supported and driven by a plurality of V-shaped driving members 14, while the facing 13 is supported and driven by a plurality of V-shaped driving members 15. The driving members 14 and 15 alternate about the circumference of the assembly, the outer portions of the members 14 being axially offset in one direction into the plane of the inside surface of the facing 12, and the outer portions of the members 15 being axially offset in the opposite direction into the plane of the inner surface of the facing 13.

All of the V-shaped driving members 14 and 15 are connected, at the inner ends of their legs, to projecting tabs 16 on the periphery of the disk 11—the legs of the driving members at their points of connection with the tabs 16 being preferably lapped with each other and secured to the tabs by common attaching rivets 17. The driving members 14 and 15 provide a rigidly bracing truss-like support for the facings 12 and 13 in directions circumferentially of the assembly, but are flexible in directions axially of the assembly whereby to permit the facings to move easily toward and away from each other. The driving members 14 are attached at their apexes to the facing 12 by rivets 18, while the driving members 15 are attached at their apexes to the facing 13 by rivets 19. The driving members are preferably made of spring metal, and are preferably bowed initially toward each other at their outer ends, as illustrated in Fig. 12, whereby to create a uniform pre-load pressure on the facings, which pressure will act against the opposite sides of the hereinafter described cushioning means and will tend to urge the facings as close together as possible on the interposed cushioning means.

The outer portions of the driving members 14 and 15 are inlaid within snugly fitting and circumferentially interlocking V-shaped grooves 20 and 21 formed respectively in the inside non-friction surfaces of the facings 12 and 13. This interlocking engagement absorbs both circumferential and radial stresses, thereby in large measure relieving the rivets from the stresses to which the assembly is subjected in service. As the V-shaped driving members can be made quite thin in view of the circumferential rigidity obtained from their angular disposition, the clutch plate need have only a very small spinning inertia. Between the grooves 20 and 21 the inside surface of the friction facings 12 and 13 may be additionally grooved out, as at 22, thereby further lightening the assembly and affording numerous air passages to facilitate rapid cooling. The grooves 22 permit circulation of air even when the cushion members are fully compressed. The resulting reduction in the area of contact between the facings and the cushion members correspondingly reduces the rate of heat transfer, since that rate is proportional to the area of contact.

The axial offset of the outer portions of the driving members 14 and 15, and the flush disposition of such portions in the grooves in the inside surfaces of the facings, provide a circumferentially continuous open space between the facings—which space is occupied by the cushioning means. In the clutch plate of Figs. 1 to 15 inclusive this cushioning means consists of a plurality of generally arcuate spring metal plates 23. These plates are preferably made of very light gauge material and are preferably deformed axially along arcuate bend lines, which bend lines are concentric with each other but are preferably eccentric to the center of the clutch plate, all as indicated by the bend-line radii 24 in Fig. 16. The holes in the cushion member—of which there are preferably three—for the reception of the attaching rivets are preferably formed on an arc which is concentric with the assembly, the two end rivet holes being located on elevated bend lines, and the center hole being located on an intervening low bend line. Fig. 17 illustrates the radial deformation employed to give the requisite cushioning. These cushion members 23 are each attached at circumferentially spaced points to both of the facings 12 and 13, one of the cushion members being attached at its center to one of the facings and the next cushion member being attached adjacent its ends to the other facing. The cushion members are preferably attached to the facings by the same rivets 18 and 19 that are used to attach the driving members 14 and 15 to their respective facings. The off-center positioning of the concentrically arranged peaks and valleys of the wave convolutions in the cushioning members will enable the latter to expand radially as the plate is compressed without shearing the facing rivets 18 and 19—this in spite of the fact that the cushioning members are attached to both facings and at the peaks of spaced convolutions. The cushion members 23, in addition to being deformed axially as shown in Fig. 17, are also preferably bowed circumferentially, as shown in Fig. 18. By riveting the center of the cushion member to the facing from which it is initially spaced by reason of such bowing, the facings will be initially drawn toward each other as the bow becomes straightened out in the assembly operation, thereby creating a force tending to cause the facings to snug tightly against the opposite faces of the cushion members. By forming the bend lines in the cushion members concentrically with respect to each other about centers which are offset with respect to the center of the assembly, the flattening out of the cushion members during compression of the plate will not be interfered with by the fixed locations of the attaching rivets 18 and 19—the cushion members expanding and contracting radially adjacent their opposite ends and at the same time skewing slightly about the rivets in such manner as to avoid binding on the rivets.

The cushion members 23 may be cut advantageously from a strip of stock in the manner indicated in Fig. 19, thereby eliminating any substantial waste of stock and maintaining the direction of the grain of the stock unchanged in all of the cushion members. The driving members 14 and 15 may likewise be cut advantageously from a strip of stock, in the manner illustrated in Fig. 13, without appreciable waste and without any change in the direction of the grain in the stock.

In the modification shown in Fig. 20 the grooves 25 in the inside surfaces of the facings, provided for the reception of the apexes of the V-shaped driving members 26, are cut in the facings by a milling operation, and the milling tool is set on such a radius as to cut two of the grooves at the same time, thus materially reducing the number of milling-out operations. Prior to the formation of the grooves 25 the facings preferably have molded into the same enlarged entrance grooves 27 (as shown in Fig. 20). These entrance grooves 27 are preferably wider and deeper than the grooves 25, with the result that the close fit of the driving members 26 can be obtained in the milled grooves 25 at all points adjacent the apexes of the members 26 while allowing a certain latitude of movement of the legs of the driving members in the entrance grooves. This clearance about the legs of the driving members at the points where the legs enter the closely fitting milled-out grooves 25 reduces the necessity of close tolerances throughout the entire lengths of the legs and at the same time allows some freedom of movement of the legs adjacent their ends with respect to the inner edges of the facings, which freedom of movement facilitates flexing of the legs axially of the assembly during compression of the peripheral portion of the plate.

Figure 23:
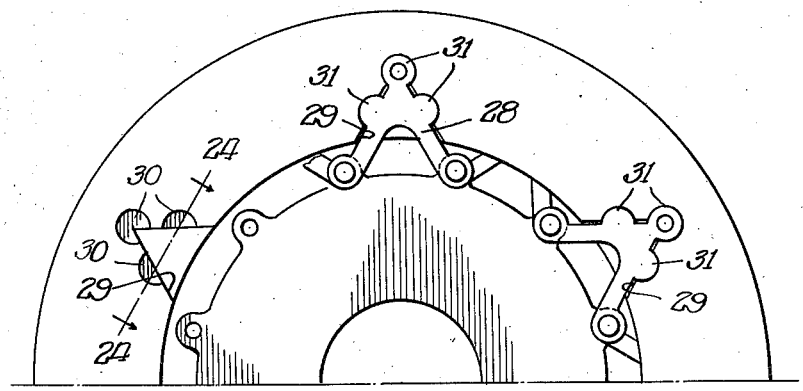
Fig. 23 is a partially broken away face view of another clutch plate which embodies a further modification of the invention.
Figure 24:
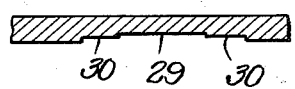
Fig. 24 is a section through one of the facings of the plate shown in Fig. 23, taken on the line 24—24 of Fig. 23.

In the modification shown in Fig. 23 the positioning and close fit of the driving members 28 within the grooved-out portions of the facings is obtained by first molding a V-shaped groove 29 in the facing, then drilling out circular recesses 30 about the edges of the molded groove 29 and then providing the V-shaped driving members 28 with circular embossments 31 of such size as to fit tightly within the drilled-out recesses 30. In this manner an extremely close fit can be obtained with small circular drilling or counterboring operations.

Figure 25:
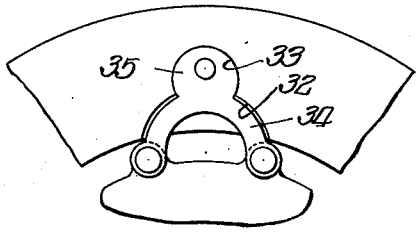
Fig. 25 is a fragmentary inside face view of one of the facings in a further modified clutch plate, showing a different form of driving member.

A somewhat similar modification is shown in Fig. 25. In this modification a relatively large and deep semi-circular recess 32 is molded in the facing and a single semi-circular recess 33 is drilled in the outer portion of the molded recess 32. The driving member 24 is provided with semi-circular legs. The legs of the driving member 34 fit loosely within the molded recess 32 and the driving member is provided with a semi-circular projection 35 at its apex which fits tightly within the drilled-out recess 33.

Figure 26:
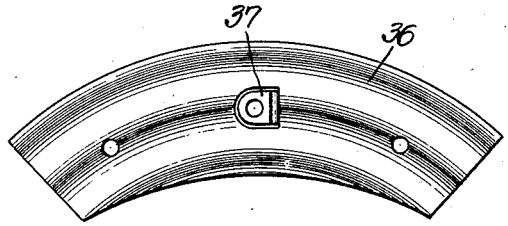
Fig. 26 is a face view of a modified cushion member, for optional use in connection with the invention.

In Fig. 26 is shown a modified cushion member 36 in which the bend lines are not only concentric with each other but also concentric with the assembly, and in which a tongue 37 is cut at the center of the cushion member for the reception of one of the attaching rivets, thereby permitting flattening and radial expansion of the spring member without unduly stressing the spring member at the locations of the rivets.

In the modification shown in Figs. 27 to 30 inclusive a close fit of the edges 38 of the driving member 39 with the opposed edges 40 of the driving groove in the facing is obtained by the employment of flexible expansion means and the action thereon of the attaching rivet 41 in being set. The outer portion of the driving member 39 is made slightly wider than the corresponding portion of the driving groove, is provided with a slit 42 parallel to one of its edges, and is initially bowed, with the high point of the bow at the location of the hole 43 for the rivet 41. When the rivet 41 is inserted and set, the bow in the driving member will flatten out, forcing the edges 38 of the driving member into closely fitting engagement with the edges 40 of the groove in the facing. The slit 42 will allow the engaged edges of the driving member to yield slightly, whereby to effect a tight, but not overly tight, fit. This self-tightening arrangement permits of rapid and economical manufacture of the plate and assures a good fit between the driving members and the grooves in the facing irrespective of slight manufacturing variations.

A modification of this self-tightening arrangement is shown in Figs. 31 to 33 inclusive. In this embodiment the interlocking edges 44 of the driving member 45 are formed on separate tangs 46 and 47, and the confronting edges of these tangs contain semi-oval shaped recesses 48 and 49, which recesses are initially separated from each other a distance which is somewhat less than the diameter of the attaching rivet 50. When the rivet 50 is inserted it will cam the tangs 46 and 47 away from each other and into tight engagement with the edges 51 and 52 of the driving groove in the facing, in the manner illustrated in Fig. 32.

In Fig. 34 a somewhat similar self-tightening driving member 53 is shown provided with serrations in its driving edges 54 and 55, which serrations will embed themselves in the material of the facing when the tangs are forced apart.

I claim:

1. In a clutch plate of the type characterized by a disk, and a pair of annular friction facings beyond the outer periphery of the disk, cushioning means between the facings, and structurally separate driving means for the cushioned facings comprising a plurality of driving members which are connected at their inner portions to the disk and at their outer portions to the facings and which are characterized by strap-like portions which are arranged angularly with respect to the radii of the clutch plate passing through the driving members.

2. In a clutch plate of the type characterized by a disk, and a pair of annular friction facings beyond the outer periphery of the disk, a plurality of generally V-shaped driving members which are connected adjacent the ends of their legs to the disk and adjacent their apexes to the facings, and means between the facings for cushioning the same.

3. In a clutch plate of the type characterized by a disk, and a pair of annular friction facings beyond the outer periphery of the disk, a plurality of generally V-shaped driving members which are connected adjacent the ends of their legs to the disk and adjacent their apexes to the facings, with the apexes of the driving members offset axially in opposite directions for connection with first one facing and then the other.

4. In a clutch plate of the type characterized by a disk, and a pair of annular friction facings beyond the outer periphery of the disk, a plurality of generally V-shaped driving member which are connected adjacent the ends of their legs to the disk and adjacent their apexes to the facings, with the apexes of the driving members offset axially in opposite directions for connection with first one facing and then the other, and with the legs of the driving members for one facing connected to the disk at the same points as the legs of the intervening driving members for the other facing.

5. In a clutch plate of the type characterized by a disk, and a pair of annular friction facings beyond the outer periphery of the disk, a plurality of generally V-shaped driving members which are connected adjacent the ends of their legs to the disk and adjacent their apexes to the facings, with the portions of the driving members adjacent their apexes inlaid within open V-shaped grooves formed in the non-friction surfaces of the facings, in closely interlocked association with said grooves.

6. In a clutch plate of the type characterized by a disk, and a pair of annular friction facings beyond the outer periphery of the disk, a plurality of curved driving members which are connected at their inner portions to the disk and at their outer portions to the facings, said facings being provided with curved grooves for the reception of the driving members, and certain of said grooves being arranged concentrically with respect to each other.

7. In a clutch plate of the type characterized by a disk, and a pair of annular friction facings beyond the outer periphery of the disk, a plurality of driving members which are connected at their inner portions to the disk and at their outer portions to the facings, with the outer portions of the driving members inlaid within open grooves formed in the non-friction surfaces of the facings in closely interlocked association with said grooves and with the portions of the driving members inwardly of the aforesaid portions inlaid within loosely fitting inward extensions of said grooves.

8. In a clutch plate of the type characterized by a pair of annular friction facings, a plurality of arcuate cushion members positioned between the facings, each of said cushion members being deformed axially along arcuate bend lines, which bend lines are concentric with each other but eccentric with respect to the center of the clutch plate, and rivets which connect each cushion member with both facings, said rivets passing through different bend lines of the cushion member and being arranged equidistant from the center of the clutch plate.

9. A sheet metal cushion member of uniform thickness, for use in a clutch plate, said member being curved back and forth along arcuate bend lines to provide a multiplicity of arcuately shaped supporting areas, said areas being concentric with each other but eccentric relative to the center of said plate.

10. For use in a clutch plate, a cushion member having a multiplicity of arcuately shaped concentric waves with at least two wave peak points extending to one side and at least one wave peak point extending to the opposite side, and rivet holes in said peak points for use in securing the cushion member in place, said waves being eccentric with respect to the center of the plate.

11. A segmental clutch driven plate cushion member adapted to be symmetrically arranged with other like cushion members about the center of the plate, which is initially distorted into a wave form having a multiplicity of arcuately shaped waves, which waves are concentric with each other but are eccentric with the symmetrical axis of the segment.

12. A clutch driven plate friction member, having at least two arcuate driving abutments for coaction with as many different driving members, which abutments are so arranged as to form arcs of the same circle.

13. A clutch driven plate friction member, having recesses formed to constitute driving abutments for coaction with as many different driving members and other relatively large connecting recesses in which the said driving surfaces terminate.

14. A clutch driven plate friction member, having driving recesses for coaction with as many different driving members and also relieving recesses which are circumferentially wider than said driving recesses.

15. A clutch driven plate friction member, having driving recesses for coaction with as many different driving members and also relieving recesses which are axially deeper than said driving recesses.

16. For use in a clutch driven plate assembly having an annular friction member, driving means for carrying said friction member, said means constituting a two-legged truss, said legs being disposed in the plane of rotation of the plate and diverging inwardly at a point outwardly of the inner edge of the friction member.

17. In a clutch driven plate, driving means for supporting a friction member, said means being generally V-shaped and disposed in the plane of rotation of the plate, with its wider portion inwardly for attachment to the central portion of said plate and its narrower portion outwardly for attachment to said friction member.

18. For use in a clutch driven plate assembly having a friction member, driving means for the friction member, the side edges of said means cooperating with a recess in said friction member to form a driving contact, and certain portions of said driving means being expandable during assembly to form a driving engagement with said recess.

19. For use in a clutch driven plate assembly having a friction member, driving means for carrying said friction member, and rivets for connecting said driving means to said friction member, said driving means including flexible expansion means actuated by the setting of the rivets for effecting a tightly interlocking connection between the driving means and the friction member.

20. For use in a clutch driven plate assembly having a friction member, driving means for carrying said friction member, and rivets for connecting said driving means to said friction member, said driving means including flexible expansion means actuated by the setting of the rivets for effecting a tightly interlocking connection between the driving means and the friction member, said flexible expansion means being actuated by the clamping effect of the rivets.

21. For use in a clutch driven plate assembly having a friction member, driving means for carrying said friction member, and rivets for connecting said driving means to said friction member, said driving means including flexible expansion means actuated by the setting of the rivets for effecting a tightly interlocking connection between the driving means and the friction member, said expansion means being actuated by a camming effect of the rivets.

GEORGE I. GOODWIN.